US012459268B2

(12) United States Patent
Omura et al.

(10) Patent No.: US 12,459,268 B2
(45) Date of Patent: Nov. 4, 2025

(54) LIQUID EJECTION DEVICE

(71) Applicant: CANON KABUSHIKI KAISHA, Tokyo (JP)

(72) Inventors: Atsushi Omura, Kanagawa (JP); Hiroki Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/513,138

(22) Filed: Nov. 17, 2023

(65) Prior Publication Data

US 2024/0173986 A1 May 30, 2024

(30) Foreign Application Priority Data

Nov. 29, 2022 (JP) ................................ 2022-190107

(51) Int. Cl.
*B41J 2/175* (2006.01)

(52) U.S. Cl.
CPC ....... *B41J 2/17513* (2013.01); *B41J 2/17509* (2013.01); *B41J 2/17553* (2013.01); *B41J 2002/17516* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2002/17516; B41J 29/02; B41J 29/113
See application file for complete search history.

(56) References Cited

U.S. PATENT DOCUMENTS

| | | | | |
|---|---|---|---|---|
| 6,354,888 | B1 * | 3/2002 | Cech | H01R 9/2691 439/716 |
| 6,530,654 | B2 * | 3/2003 | Kitabatake | B41J 2/17553 347/86 |
| 8,439,491 | B2 | 5/2013 | Hayashi et al. | B41J 2/14 |
| 8,485,642 | B2 | 7/2013 | Hayashi et al. | B41J 2/14 |
| 8,529,037 | B2 | 9/2013 | Miyashita et al. | B41J 2/175 |
| 8,960,869 | B2 | 2/2015 | Takada et al. | B41J 2/175 |
| 9,724,929 | B2 | 8/2017 | Yoshii et al. | B41J 2/175 |
| 9,919,536 | B2 | 3/2018 | Miyashita et al. | B41J 2/175 |
| 10,029,474 | B2 | 7/2018 | Takada et al. | B41J 2/175 |
| 10,160,222 | B2 | 12/2018 | Shiba et al. | B41J 2/195 |
| 10,336,087 | B2 | 7/2019 | Miyashita et al. | B41J 2/165 |
| 10,391,776 | B2 | 8/2019 | Hayashi et al. | B41J 2/175 |

(Continued)

FOREIGN PATENT DOCUMENTS

JP 2019-177550 10/2019

*Primary Examiner* — Anh T Vo
(74) *Attorney, Agent, or Firm* — Venable LLP

(57) ABSTRACT

A liquid ejection device includes: an ejection head configured to eject a liquid; a first storage container configured to store the liquid to be supplied to the ejection head; and a second storage container attachable to and detachable from the liquid ejection device and connectable with the first storage container, the second storage container includes a storage space for containing the liquid to be supplied to the first storage container. The first storage container includes a contact portion that comes into contact with the second storage container in a state where the first storage container is connected with the second storage container. The contact portion deforms the second storage container so as to decrease a volume of the storage space of the second storage container in a process of connecting the second storage container to the first storage container.

10 Claims, 7 Drawing Sheets

(56) References Cited

U.S. PATENT DOCUMENTS

| | | | | |
|---|---|---|---|---|
| 10,675,882 | B2 | 6/2020 | Shiba et al. | B41J 2/195 |
| 10,836,175 | B2 | 11/2020 | Miyashita et al. | B41J 2/175 |
| 11,433,677 | B2 | 9/2022 | Omura et al. | B41J 2/175 |
| 11,472,191 | B2 | 10/2022 | Takei et al. | B41J 2/175 |
| 11,590,759 | B2 | 2/2023 | Nanjo et al. | B41J 2/175 |
| 11,597,210 | B2 | 3/2023 | Kishikawa et al. | B41J 2/175 |
| 11,660,873 | B2 | 5/2023 | Koshikawa et al. | B41J 2/175 |
| 2023/0001701 | A1 | 1/2023 | Takei et al. | B41J 2/175 |
| 2023/0074874 | A1 | 3/2023 | Omura | B41J 2/175 |
| 2023/0173817 | A1 | 6/2023 | Kishikawa et al. | B41J 2/175 |
| 2023/0302806 | A1 | 9/2023 | Noda et al. | B41J 2/175 |

* cited by examiner

LIQUID EJECTION DEVICE

BACKGROUND OF THE INVENTION

Field of the Invention

The present invention relates to a liquid ejection device.

Description of the Related Art

Conventionally, there is known an inkjet recording device that includes ink tanks mounted on a main body thereof as a liquid ejection device that performs a recording operation on recording media by using an ejection head that ejects a liquid such as ink toward the recording media. In such a device, when ink stored in an ink tank is supplied to the ejection head, the ink is ejected from the ejection head.

In the above-described device, a storage container such as an ink cartridge that hold ink inside is used to load the ink to the ink tank. With the ink cartridge being connected to the ink tank, the ink in the cartridge is supplied to the ink tank as appropriate. Japanese Patent Application Publication No. 2019-177550 discloses a configuration where, when ink is loaded to an ink tank, the ink tank is connected to a joint portion, both of the ink tank and the ink cartridge are opened to the atmosphere. According to the configuration, the ink is loaded from the ink cartridge to the ink tank using a so-called hydraulic head difference.

SUMMARY OF THE INVENTION

However, there is a concern that an ink loading method that uses a hydraulic head difference may cause a phenomenon (hereinafter, such a phenomenon will be referred to as bubble clogging) of blocking ink supply due to bubbles entering a joint needle that makes an interior of an ink tank and an interior of an ink cartridge communicate with each other.

With the foregoing in view, it is an object of the present invention to provide a liquid ejection device that can prevent occurrence of bubble clogging, and smoothly supply a liquid.

To achieve the above-described object, a liquid ejection device according to the present invention includes:

an ejection head configured to eject a liquid;

a first storage container configured to store the liquid to be supplied to the ejection head; and a second storage container attachable to and detachable from the liquid ejection device and can be connectable with the first storage container, the second storage container including a storage space for containing the liquid to be supplied to the first storage container, wherein the first storage container includes a contact portion that comes into contact with the second storage container in a state where the first storage container is connected with the second storage container, and wherein the contact portion deforms the second storage container so as to decrease a volume of the storage space of the second storage container in a process of connecting the second storage container to the first storage container.

According to the present invention, it is possible to prevent occurrence of bubble clogging, and smoothly supply a liquid.

Further features of the present invention will become apparent from the following description of exemplary embodiments with reference to the attached drawings.

DESCRIPTION OF THE EMBODIMENTS

Figure 1:
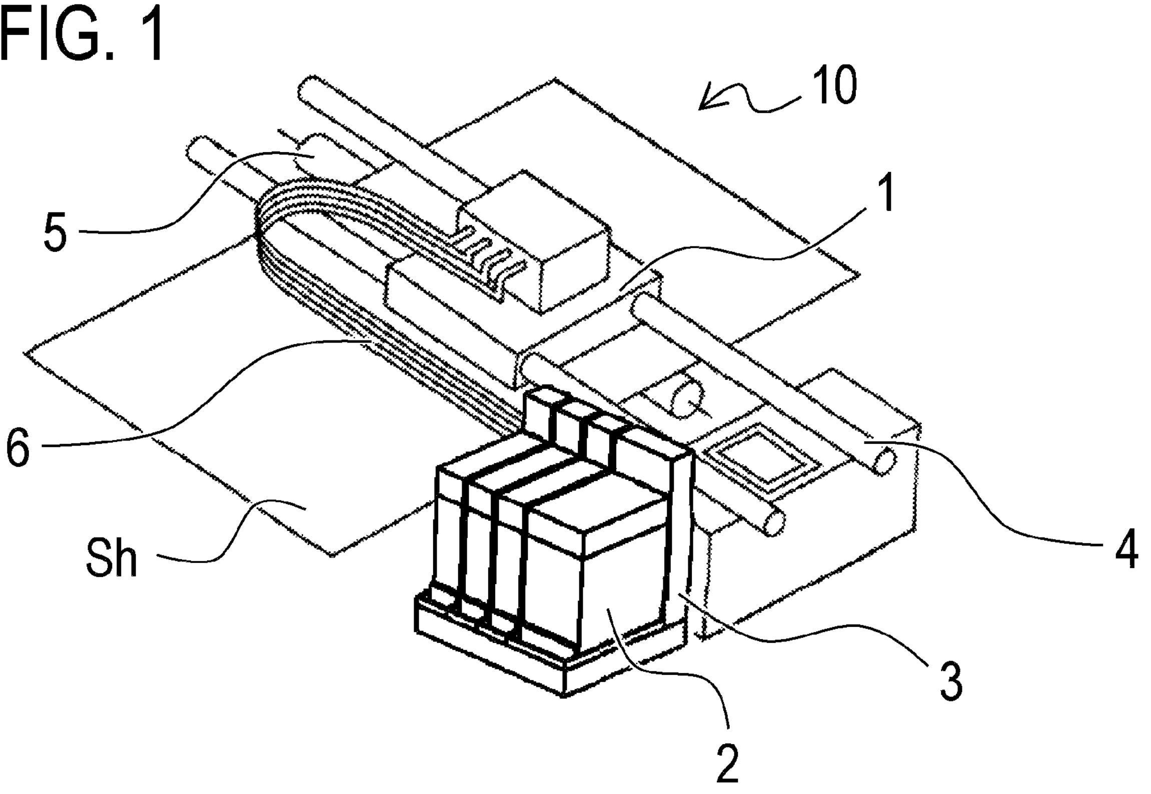
FIG. 1 is a perspective view illustrating main components of a recording device according to a first embodiment.

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. A plurality of features are described in each of the following embodiments, but all of these features are not essential for the invention, and these features may be arbitrarily combined. In the accompanying drawings, an identical or similar composing element is denoted with a same reference numeral, and redundant description may be omitted.

Hereinafter, a liquid ejection device according to embodiments of the present invention will be described. Hereinafter, the embodiments where the present invention is applied to an inkjet printer on which an ejection head that ejects ink as an example of a liquid is mounted will be described. However, the present invention is not limited to this specific configuration. Furthermore, the embodiments described below are one embodiment to which the present invention is applied, and therefore technically preferable various limitations are added thereto. However, as long as the technical idea of the present invention is met, the present invention is not limited to the embodiments and other specific methods in this description. Note that components having the same functions will be assigned the same reference numerals in the following description, and description of overlapping portions will be omitted.

First Embodiment

Recording Device 10

First, a configuration of the recording device 10 that is an inkjet printer according to the first embodiment will be described. FIG. 1 is a perspective view illustrating main components of the recording device 10. The recording device 10 is a liquid ejection device that includes an ejection head (recording head) 1, cartridges 2, and tanks 3, and can eject ink as a liquid.

The recording device 10 repeats reciprocating movement (horizontal scanning) of the ejection head 1, and conveyance (vertical scanning) per predetermined pitch of recording media. The recording device 10 is a serial-type inkjet printer that forms characters, symbols, images, and the like by selectively ejecting a liquid such as ink from the ejection head 1 and adhering the liquid to a recording sheet Sh in synchronization with motions of these reciprocating movement and conveyance. The recording device 10 can use the recording sheet Sh such as general recording paper, special paper, and OHP films as the recording sheets Sh.

The ejection head 1 is slidably supported by two guide rails 4, and is configured to perform reciprocating movement in a direction (horizontal scanning direction) perpendicular to a conveyance direction (vertical scanning direction) of the recording sheet Sh along the guide rails 4 by driving means such as a motor. The recording sheet Sh is conveyed by a conveying roller 5 in a state where the recording sheet Sh faces a liquid ejection surface of the ejection head 1 and is maintained at a fixed distance to the liquid ejection surface.

The ejection head 1 includes a plurality of ejection port rows that each eject a liquid of a different color. A recording element portion to be described later is mounted on the ejection head 1. A plurality of thermoelectric conversion elements (heaters) or piezoelectric elements are aligned as ejection energy generation elements that eject a liquid are aligned on the recording element portion. The liquid is supplied from the tank 3 to the ejection head 1 via a tube 6 that is a liquid supply path. Furthermore, the ejection energy generation element causes the liquid to be ejected from the ejection port of the ejection head 1. In a case where, for example, the thermoelectric conversion elements are used as the ejection energy generation elements, the liquid is blown by heat generation of the heater, and the liquid is ejected from the ejection port using this blowing energy.

The recording device 10 is provided with the four tanks 3, and the four cartridges 2 are configured to be attachable to and detachable from the recording device 10. The cartridge 2 is attached to the recording device 10 and connected with the tank 3, and is detached from the recording device 10 and disconnected from the tank 3. That is, the cartridge 2 is configured to be connectable with and disconnectable from the tank 3. The four tanks 3 store liquids of different colors, and supply the liquids to the ejection head 1. Furthermore, the four cartridges 2 also store the liquids of the different colors, and are connected with the tanks 3 that store the liquids of the corresponding colors. That is, the recording device 10 includes a plurality of the tanks (first storage container) 3 and a plurality of the cartridges (second storage container) 2 as the storage containers that store liquids such as inks.

Note that, although each drawing illustrates a minimum configuration for the sake of description of the present invention, a structure may be added as needed. For example, marks for improving visibility of elements and contents for recording information of the tanks, and structures such as springs and protrusions related to attachment and removal of the other tanks may be provided to the recording device 10.

Cartridge 2

Figure 2A:
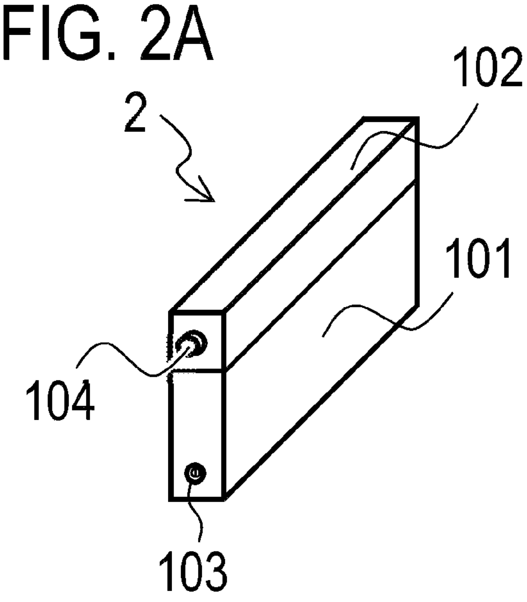
FIGS. 2A and 2B are perspective views illustrating a cartridge according to the first embodiment.
Figure 2B:
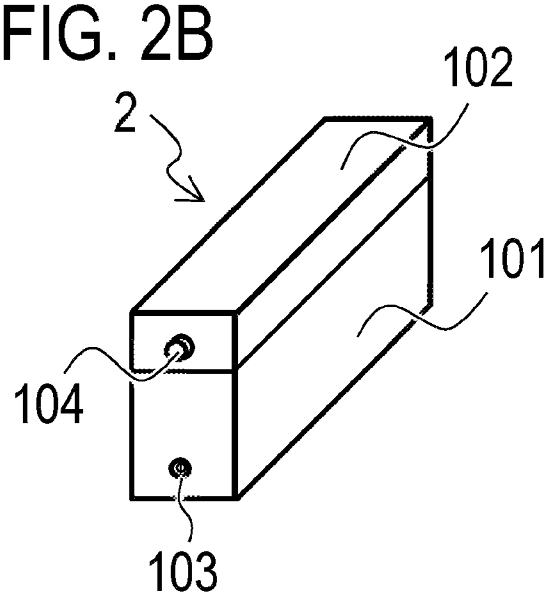

Next, the cartridge 2 according to the first embodiment will be described. FIG. 2A is a perspective view of the cartridge 2 having the narrow width. FIG. 2B is a perspective view of the cartridge 2 having the narrow width. The cartridge 2 includes a liquid holding portion 101, a top panel portion 102, a joint portion 103 for supplying a liquid, and a damper portion 104. The cartridge 2 increases the pressure inside the cartridge 2 when deformation of the damper portion 104 decreases the volume of a storage space for storing a liquid, and supplies the liquid to the tank 3. Details of a mechanism that supplies the liquid from the cartridge 2 to the tank 3 will be described later.

The cartridge 2 has a substantially cuboid shape, and is provided with the top panel portion 102 adjacent on the liquid holding portion 101. The joint portion 103 is provided at one end of the liquid holding portion 101 in a longitudinal direction of the cartridge 2. Furthermore, the damper portion 104 is provided to the top panel portion 102, and is located at one end of the top panel portion 102 on the same side as that of the joint portion 103 in the longitudinal direction of the cartridge 2. The damper portion 104 is configured to protrude in the longitudinal direction from the top panel portion 102.

The joint portion 103 is formed by forming a slit in an elastic body member. In a case where the present invention is applied, the joint portion 103 is not limited to the above-described configuration, and may be a joint portion that is generally widely used for liquid storage containers, and keep a sealing property.

The damper portion 104 according to the first embodiment is an elastic deforming portion formed by an elastic body, and constitutes part of an exterior portion of the cartridge 2. A material of the damper portion 104 does not matter as long as the material is a material that readily deforms to some degree, yet is preferably a material such as rubbers and other elastic bodies that restore without being applied an external force after deformation. This material is preferable because the damper portion 104 restores to the original shape even when the damper portion 104 unintentionally deforms until the cartridge is manufactured and used.

Note that, although the liquid holding portion 101 and the top panel portion 102 are formed as separate members in the cartridge 2 in the first embodiment, the cartridge 2 may be manufactured as an integral type and formed without a boundary between the liquid holding portion 101 and the top panel portion 102. Furthermore, the recording device 10 according to the first embodiment employs the configuration where the cartridges 2 of the different widths illustrated in FIGS. 2A and 2B are attachable. However, all the widths of the plurality of cartridges 2 may be the same.

Cartridge Attachment Portion 200

Figure 3B:
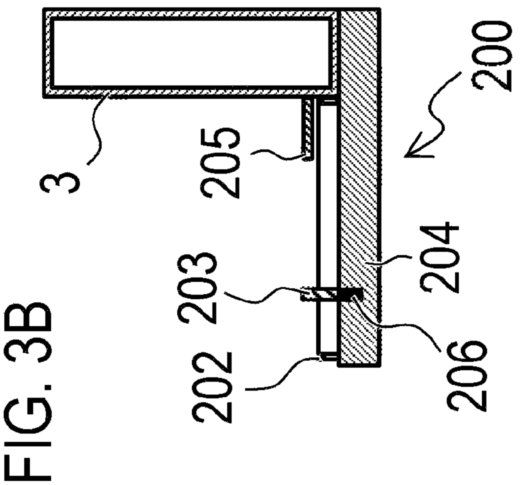
FIGS. 3A and 3B are views illustrating tanks according to the first embodiment.
Figure 3A:
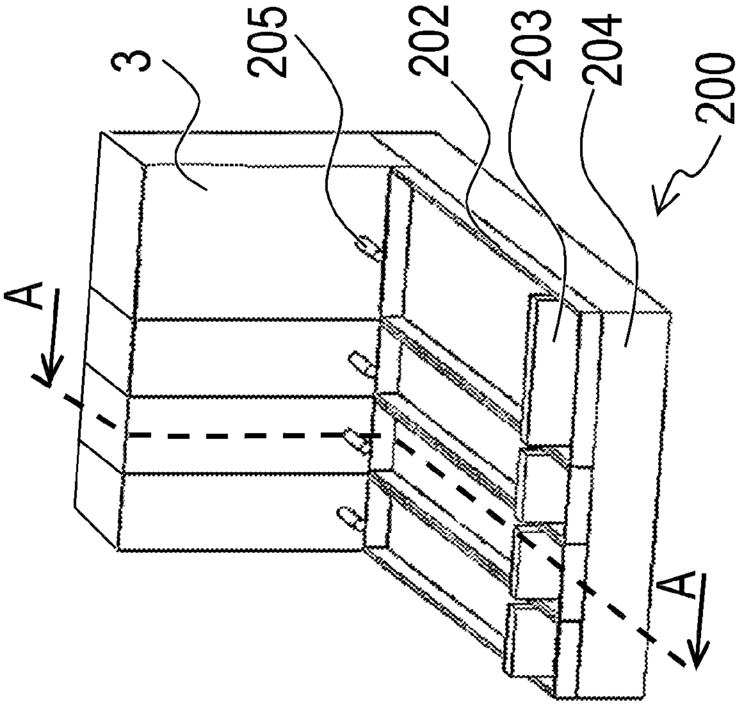

Next, a cartridge attachment portion 200 to which the cartridges 2 are attached will be described. FIG. 3A is a perspective view of the cartridge attachment portion 200, and FIG. 3B is an A-A cross-sectional view of FIG. 3A. The cartridge 2 is attached to the cartridge attachment portion 200 in a state where the cartridge 2 is connected to the tank 3, and supplies the liquid to the tank 3. Furthermore, the tank 3 stores inside the liquid to be supplied to the ejection head 1.

The cartridge attachment portion 200 includes holding portions 202, fixing members 203 that are fixing portions that fix positions of the cartridges 2, a base 204 that supports the cartridges 2 and the tanks 3, and joint needles 205 that protrude from the tanks 3 and extend. The holding portion 202 extends protruding from the base 204 to an upper direction, and holds the cartridge 2 by surrounding the four sides of the cartridge 2 when the cartridge 2 is placed on the base 204.

The fixing member 203 is provided movably in an upper/lower direction, and moves between a position at which the fixing member 203 protrudes from the base 204 and a position at which the fixing member 203 is accommodated inside the base 204. The fixing member 203 is biased by a biasing member 206 from below toward the upper direction (a direction in which the fixing member 203 protrudes from the base 204) at all times. That is, in a state where the external force is not acting on the fixing member 203, the fixing member 203 is located protruding from the base 204. Note that, in the case where the present invention is applied, a movement mechanism of the fixing member 203 is not limited to the above-described configuration, the present invention is also applicable to, for example, a configuration where structures such as the fixing member 203 are moved by electronic control.

The base 204 is a support member that supports the cartridges 2 and the tanks 3 from below. The joint needle 205 is a hollow member that connects with the joint portion 103 of the cartridge 2, and is a supply path forming portion that forms a supply path for supplying the liquid from the cartridge 2 to the tank 3. The joint needle 205 is connected to the tank 3, and is provided protruding from the tank 3 toward the holding portion 202.

Note that the tanks 3 are installed to the cartridge attachment portion 200 similar to the cartridges 2 in the first embodiment, yet application of the present invention is not limited to this configuration. For example, the present invention is also applicable to, for example, a configuration where the tanks 3 are mounted inside or outside a main body of the ejection head 1 or the recording device 10.

Cartridge Attachment Method

Next, an internal configuration and an attachment method of the cartridge 2 will be described. FIGS. 4A to 4E are views illustrating a method for attaching the cartridge 2 to the cartridge attachment portion 200 to connect with the tank 3. FIGS. 4A to 4E each illustrate a cross-sectional view of the cartridge 2 and the cartridge attachment portion 200, and an enlargement view of the vicinity of the damper portion 104 of the cartridge 2.

The damper portion 104 is formed with a damper member sandwiched between groove portions 111 provided to the cartridge 2. The interior of the damper portion 104 is a cavity, and communicates with a storage space 112 of a liquid Li formed inside the cartridge 2. The storage space 112 of the cartridge 2 is formed by the liquid holding portion 101, the top panel portion 102, and the damper portion 104. In other words, the liquid holding portion 101, the top panel portion 102, and the damper portion 104 form the exterior portion of the cartridge 2, and forms the storage space 112. Note that the damper portion 104 may be fixed to the cartridge 2 by an adhesive, or may be thermally welded to the cartridge 2. It is sufficient that the present invention is applied to the configuration where the interior of the damper portion 104 forms part of the storage space 112 of the cartridge 2 and keeps the sealing property of the storage space 112.

The cartridge 2 is provided with an atmosphere communication port 105 that makes the storage space 112 communicate with the outside, and a shutter 106 that is configured to be able to open and close the atmosphere communication port 105. The atmosphere communication port 105 is provided at the other end on an opposite side to the one end of the top panel portion 102 at which the damper portion 104 is located in the longitudinal direction of the cartridge 2. Furthermore, the shutter 106 is provided at the other end of the cartridge 2. The shutter 106 is provided slidably in the upper/lower direction with respect to the liquid holding portion 101 and the top panel portion 102, and opens and closes the atmosphere communication port 105 when the shutter 106 moves upward and downward.

Figure 4A:
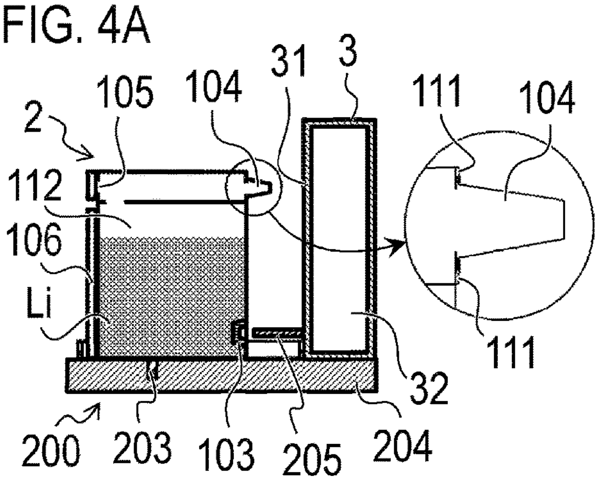
FIGS. 4A to 4E are cross-sectional views illustrating a cartridge attachment method according to the first embodiment.

A series of a flow of attaching the cartridge 2 to the cartridge attachment portion 200 to connect to the tank 3 will be described. FIG. 4A illustrates that the cartridge 2 is placed on the base 204. The cartridge 2 is placed on the base 204 with such a posture that the joint portion 103 faces the joint needle 205 and the tank 3 without interfering with the joint needle 205. That is, the cartridge 2 is placed such that the one end provided with the damper portion 104 and the joint portion 103 faces the tank 3. At this time, the fixing member 203 is pushed from the upper direction by the cartridge 2, and moves to the position at which the fixing member 203 is accommodated inside the base 204. Furthermore, when the cartridge 2 is placed on the base 204, the atmosphere communication port 105 is closed by the shutter 106, and the interior of the cartridge 2 is in a sealed state.

Figure 4D:
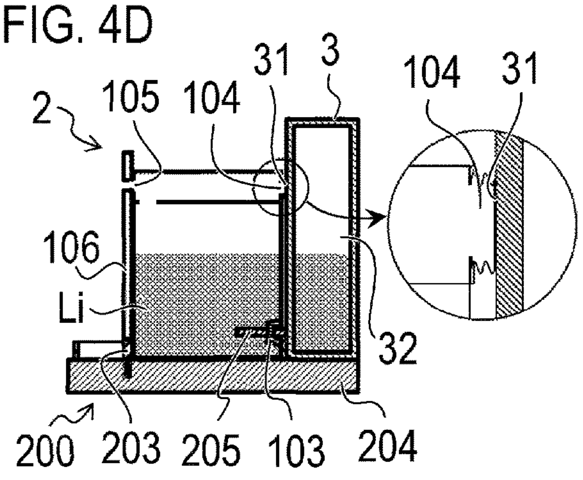
Figure 4B:
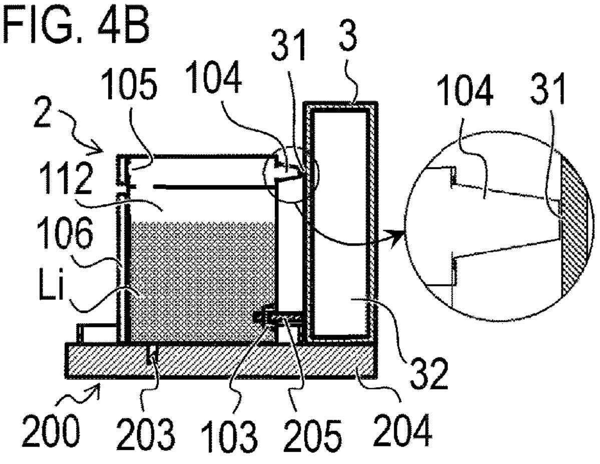

Next, the cartridge 2 is pushed in toward the tank 3 while sliding on the base 204. FIG. 4B illustrates a state immediately before the cartridge 2 moves in a direction to approach the tank 3 from the state in FIG. 4A, and the damper portion 104 comes into contact with a contact portion 31 of the tank 3. In the first embodiment, the contact portion 31 is the face of an exterior of the tank 3. When the cartridge 2 is pushed in toward the tank 3, the joint needle 205 connected to the tank 3 is inserted in the joint portion 103 of the cartridge 2. Furthermore, the storage space 112 inside the cartridge 2 and a storage space 32 inside the tank 3 communicate with each other.

Figure 4E:
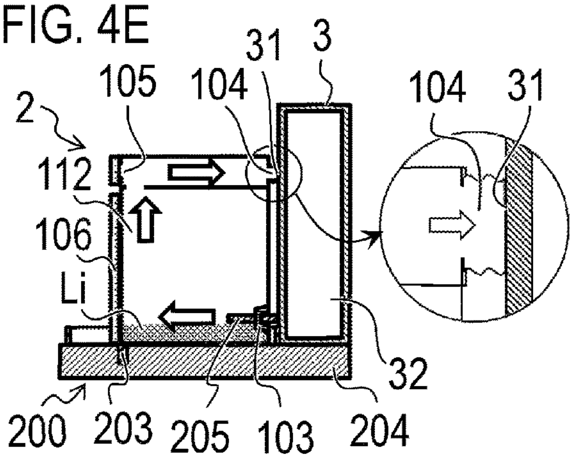
Figure 4C:
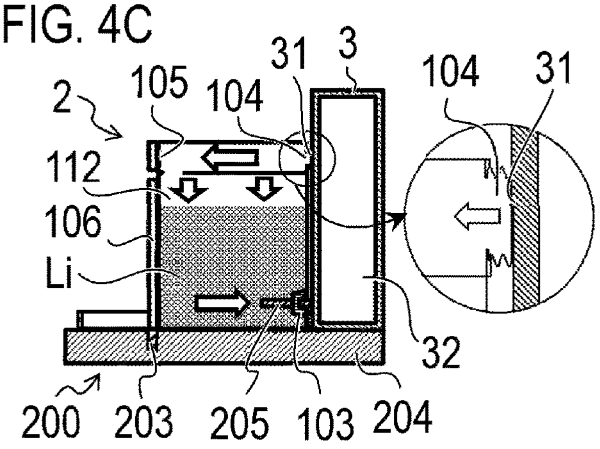

FIG. 4C illustrates a state where the cartridge 2 further moves in the direction to approach the tank 3 from the state in FIG. 4B, and the damper portion 104 comes into contact with the contact portion 31 of the tank 3 and is squashed. As described above, the damper portion 104 is formed as the elastic body, and comes into contact with the contact portion 31 and deforms so as to be squashed when the cartridge 2 is moved to approach the tank 3. That is, the contact portion 31 deforms the damper portion 104 of the cartridge 2 so as to decrease the volume of the storage space 112 of the cartridge 2 in the process of connecting the cartridge 2 to the tank 3. Thus, by employing the configuration where the exterior of the tank 3 is used as the contact portion 31 that comes into contact with the cartridge 2 and deforms the cartridge 2, it is not necessary to provide a new structure, and suppress an increase in manufacturing cost.

At this time, as illustrated in FIG. 4C, air in a space inside the damper portion 104 is pushed out in arrow directions toward a space inside the top panel portion 102 and the liquid holding portion 101. Furthermore, the volume of the storage space 112 of the cartridge 2 decreases, and the pressure inside the storage space 112 increases. Then, the pressure acts in such a way that the liquid Li is pushed in the joint needle 205, and the liquid Li is supplied from the cartridge 2 to the tank 3 through the joint needle 205. Furthermore, part of the liquid Li stored in the storage space 112 of the cartridge 2 moves to the storage space 32 of the tank 3.

By employing such a configuration, the liquid Li is pushed in the joint needle 205 with a stronger force than that of a configuration where a liquid is supplied using a hydraulic head difference. This is because, although the pressure to be applied to a liquid surface of the storage space 112 of the cartridge 2 is the atmospheric pressure according to the configuration that uses the hydraulic head difference, the pressure to be applied to a liquid surface of the storage space 112 of the cartridge 2 by deformation of the damper portion 104 is larger than the atmospheric pressure according to the configuration of the present embodiment. Consequently, according to the above-described configuration, it is possible to reduce a room for bubbles to enter inside the joint needle 205, and prevent occurrence of bubble clogging.

Furthermore, according to the above-described configuration, a protrusion amount of the joint needle 205 from the tank 3 is large compared to the protrusion amount of the damper portion 104 from the top panel portion 102. Hence, at a time of attachment of the cartridge 2, before the damper portion 104 comes into contact with the tank 3 and is deformed, the joint needle 205 is connected to the joint portion 103. By employing such a configuration, the damper portion 104 is prevented from deforming before the storage space 112 of the cartridge 2 and the storage space 32 of the tank 3 communicate with each other. Eventually, the pressure inside the storage space 112 rises after the joint needle 205 is reliably connected to the joint portion 103, so that the liquid is stably supplied to the tank 3 without leaking from the cartridge 2.

When the cartridge 2 moves to a predetermined position, and the shutter 106 is located just above the fixing member 203, the fixing member 203 moves in the upper direction protruding from the base 204, and the shutter 106 is pushed upward. FIG. 4D illustrates a state where the shutter 106 is moved in the upper direction by the fixing member 203. At this time, the four sides of the cartridge 2 are surrounded by the holding portion 202 and the fixing member 203, and the cartridge 2 is fixed to the cartridge attachment portion 200. Although the restoration force of the damper portion 104 acts in a direction to separate the cartridge apart from the tank 3, the fixing member 203 regulates movement of the cartridge 2, so that the position of the cartridge 2 is stably fixed.

Furthermore, when the cartridge 2 moves, and the fixing member 203 rises in the upper direction, the shutter 106 is pushed by the fixing member 203, and moves to a position to open the atmosphere communication port 105. That is, when the cartridge 2 moves to the position at which the cartridge 2 is fixed by the fixing member 203, the storage space 112 of the cartridge 2 communicates with the outside through the atmosphere communication port 105, and the pressure inside the storage space 112 becomes equal to the atmospheric pressure.

After the atmosphere communication port 105 is opened, the liquid Li is supplied from the tank 3 to the ejection head 1 as appropriate, and the liquid Li stored in the storage space 32 of the tank 3 decreases. Furthermore, when the pressure in the storage space 32 of the tank 3 decreases, the liquid Li moves from the cartridge 2 to the tank 3 so as to cancel a pressure difference between the storage space 32 and the storage space 112 of the cartridge 2. That is, every time the liquid Li is supplied from the tank 3 to the ejection head 1, the liquid Li is supplied from the cartridge 2 to the tank 3. As described above, after the pressure inside the cartridge 2 rises and part of the liquid Li is supplied from the cartridge 2 to the tank 3, the interior of the cartridge 2 is opened to the atmosphere, and thereby the liquid Li subsequently continues being supplied from the cartridge 2 to the tank 3.

Note that the cartridge 2 is provided with the shutter 106 and is configured to be able to open and close the atmosphere communication port 105 in the first embodiment, yet application of the present invention is not limited to such a configuration. The present invention is also applicable to, for example, a configuration where the atmosphere communication port 105 is closed by a seal, and the seal is peeled off after the cartridge 2 is attached to the cartridge attachment portion 200. According to such a configuration, when the seal is peeled off before the cartridge 2 is attached, it is not possible to obtain an effect of preventing occurrence of bubble clogging, and therefore it is preferable to take some measure.

When the liquid Li stored in the cartridge 2 is used up, the cartridge 2 is detached from the cartridge attachment portion 200, and the new cartridge 2 containing the liquid Li is attached to the cartridge attachment portion 200. FIG. 4E illustrates a state where the cartridge 2 moves in the direction to separate from the tank 3, and is detached from the cartridge attachment portion 200. When the cartridge 2 is separated from the tank 3, the fixing member 203 is moved to the position at which the fixing member 203 is accommodated inside the base 204, the shutter 106 moves downward, the atmosphere communication port 105 is closed, and the storage space 112 of the cartridge 2 is placed in the sealed state.

When the cartridge 2 moves to separate from the tank 3 in a state where the atmosphere communication port 105 is closed, the damper portion 104 restores from the squashed state, the volume of the storage space 112 of the cartridge 2 increases, and the pressure inside the storage space 112 decreases. Furthermore, air moves in arrow directions illustrated in FIG. 4E inside the storage space 112. By employing such a configuration, the liquid Li is drawn to the storage space 112 of the cartridge 2 even when the liquid Li is left at the joint needle 205 and the joint portion 103 at a time of detachment of the cartridge 2, so that it is possible to reduce dripping of the liquid. That is, according to the above-described configuration, it is possible to prevent the liquid Li from leaking from an outside of the cartridge 2 or the like at the time of detachment of the cartridge 2, and contaminating the cartridge attachment portion 200 with the liquid Li.

As described above, according to the first embodiment, when the cartridge 2 is attached to or detached from the cartridge attachment portion 200, the damper portion 104 deforms, the volume of the storage space 112 of the cartridge 2 changes, and the internal pressure changes. Furthermore, this change in pressure prevents occurrence of bubble clogging at the time of attachment of the cartridge 2, and reduces dripping of the liquid at the time of detachment of the cartridge 2.

Although a measure to increase a flow path diameter of the joint needle 205 may be also considered to prevent occurrence of bubble clogging, increasing the flow path diameter makes the liquid readily leak from the joint needle 205 and the cartridge 2 at a time of detachment of the cartridge 2. On the other hand, according to the first embodiment, it is not necessary to increase the flow path diameter, so that it is possible to achieve both prevention of occurrence of bubble clogging, and reduction of dripping of the liquid.

Figure 5A:
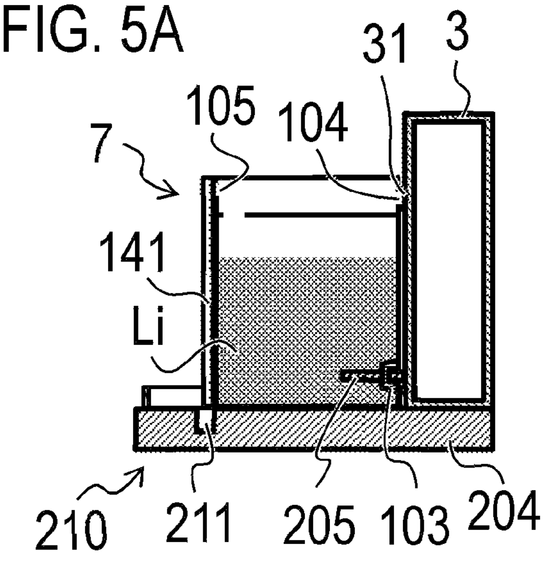
FIGS. 5A and 5B are cross-sectional views of a cartridge and a cartridge attachment portion according to a modified example.
Figure 5B:
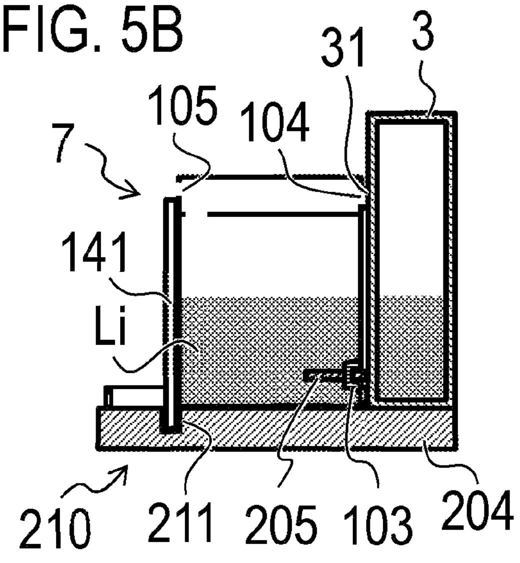

Note that, although the first embodiment employs the configuration where the fixing member 203 is provided and the cartridge 2 is fixed to the cartridge attachment portion 200, application of the present invention is not limited to this configuration. FIGS. 5A and 5B are cross-sectional views of a cartridge 7 and a cartridge attachment portion 210 according to a modified example of the first embodiment. The cartridge 7 is provided with a shutter 141 that is configured to be able to open and close the atmosphere communication port 105. Furthermore, a groove 211 that is opened in the upper direction is formed in the base 204 of the cartridge attachment portion 210.

FIG. 5A illustrates a state immediately before the cartridge 7 is attached to the cartridge attachment portion 210, and FIG. 5B illustrates a state where the cartridge 7 has been attached to the cartridge attachment portion 210. The shutter 141 is provided slidably in the upper/lower direction with respect to the liquid holding portion 101 and the top panel portion 102, and, when the shutter 141 moves upward and downward, the atmosphere communication port 105 is opened and closed. According to the modified example, when the cartridge 7 moves to a predetermined position, the shutter 141 moves in a lower direction to enter the groove 211 of the base 204, and the atmosphere communication port 105 is opened. Furthermore, the shutter 141 is inserted in the groove 211, and the cartridge 7 is fixed to the cartridge attachment portion 210. Thus, the present invention is also preferably applied to the configuration where, while the shutter 141 and the groove 211 open the atmosphere communication port 105, the cartridge 7 is fixed to the cartridge attachment portion 200. Furthermore, the first embodiment and the modified example of the first embodiment adopt the same structure for an opening/closing mechanism of the atmosphere communication port 105 and a fixing mechanism of the cartridges. However, the present invention is also applicable to a configuration where the opening/closing mechanism and the fixing mechanism are independent of each other.

Furthermore, in the first embodiment, the contact portion 31 that is the exterior of the tank 3 is placed in contact with the damper portion 104 of the cartridge 2 to deform the damper portion 104. However, application of the present invention is not limited to this configuration. The present invention is also applicable to, for example, a configuration provided with a new structure that, when the cartridge 2 is attached to the recording device 10, comes into contact with the cartridge 2 to deform the cartridge 2 so as to decrease the volume of the storage space 112 of the cartridge 2.

Second Embodiment

Next, the second embodiment according to the present invention will be described. The second embodiment differs from the first embodiment in a mechanism that changes the pressure inside the storage space 112 of the cartridge. The same components as those in the first embodiment will be assigned the same reference numerals and description thereof will be omitted in description of the second embodiment, and only characteristic components of the second embodiment will be described.

Figures 6A, 6B, 6C:
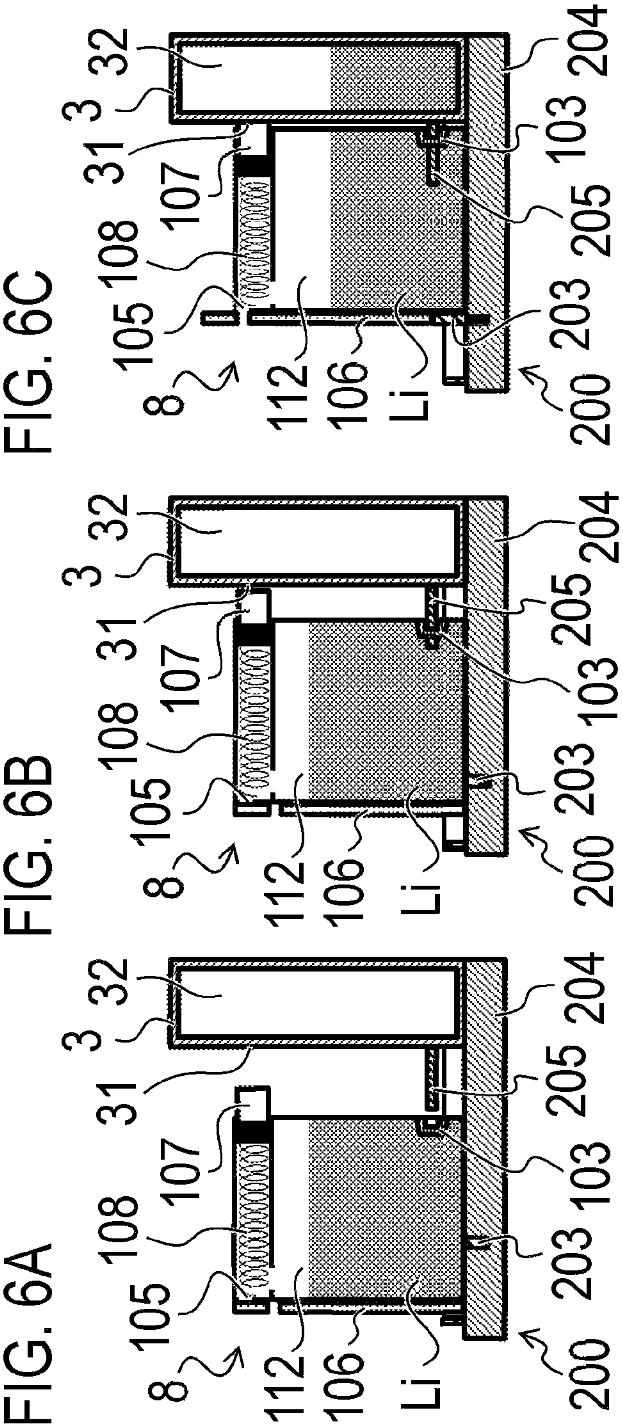
FIGS. 6A to 6C are cross-sectional views of a cartridge and a cartridge attachment portion according to a second embodiment.

FIGS. 6A to 6C are cross-sectional views of a cartridge 8 and the cartridge attachment portion 200 according to the second embodiment. The cartridge 8 is provided with a syringe portion 107 and an elastic body 108 instead of the damper portion 104. The syringe portion 107 is a cylindrical member, and is provided to close an opening formed in the top panel portion 102 of the cartridge 8. Part of the syringe portion 107 protrudes to the outside of the top panel portion 102 from the end portion on the opposite side to the end portion provided with the atmosphere communication port 105 in the longitudinal direction of the cartridge 8. Furthermore, the syringe portion 107 is configured to be slidable in the longitudinal direction of the cartridge 8 inside the top panel portion 102. In the second embodiment, the syringe portion 107 slides inside the top panel portion 102, so that the volume of the storage space 112 changes, and the pressure inside the storage space 112 changes.

At a leading end of the syringe portion 107 located inside the top panel portion 102, a cover portion is provided. The cover portion buries a gap between the syringe portion 107 and the top panel portion 102 to improve the sealing property of the storage space 112 when the atmosphere communication port 105 is closed. That is, in a state where the atmosphere communication port 105 is closed by the shutter 106, the storage space 112 of the cartridge 8 is in the sealed state.

The elastic body 108 is connected to the leading end of the syringe portion 107 located inside the top panel portion 102, and biases the syringe portion 107 in a direction to push out the syringe portion 107 to the outside of the cartridge 8. The elastic body 108 is provided, so that, even when the syringe portion 107 unintentionally receives an external force, and moves, the syringe portion 107 restores to the predetermined position.

Next, the method for attaching the cartridge 8 will be described. FIG. 6A illustrates a state where the cartridge 8 is placed on the base 204. The cartridge 8 is placed on the base 204 with such a posture that the joint portion 103 faces the joint needle 205 without interfering with the joint needle 205. That is, the cartridge 8 is placed such that the one end provided with the syringe portion 107 and the joint portion 103 faces the tank 3. In this case, the fixing member 203 is pushed by the cartridge 8 from the upper direction, and moves to the position at which the fixing member 203 is accommodated inside the base 204. Furthermore, when the cartridge 8 is placed on the base 204, the atmosphere communication port 105 is closed by the shutter 106, and the interior of the cartridge 8 is placed in the sealed state.

Next, the cartridge 8 is pushed in toward the tank 3 while sliding on the base 204. FIG. 6B illustrates a state immediately before the cartridge 8 moves in the direction to approach the tank 3 from the state in FIG. 6A, and the syringe portion 107 comes into contact with the contact portion 31 of the tank 3. The contact portion 31 is the face of the exterior of the tank 3 similar to the first embodiment. When the cartridge 8 is pushed in toward the tank 3, the joint needle 205 connected to the tank 3 is inserted in the joint portion 103 of the cartridge 8. Furthermore, the storage space 112 of the liquid inside the cartridge 8 and the storage space 32 of the liquid inside the tank 3 communicate with each other.

FIG. 6C illustrates a state where the cartridge 8 further moves in the direction to approach the tank 3 from the state in FIG. 6B, and the syringe portion 107 comes into contact with the contact portion 31 of the tank 3 and enters inside the top panel portion 102 more. As described above, the syringe portion 107 is configured to be slidable inside the top panel portion 102, and comes into contact with the contact portion 31 and moves in the direction to enter inside the top panel portion 102 when the cartridge 8 is moved to approach the tank 3. That is, the contact portion 31 moves the syringe portion 107 and deforms the cartridge 8 so as to decrease the volume of the storage space 112 of the cartridge 8 in a process of connecting the cartridge 8 to the tank 3.

At this time, the syringe portion 107 moves, so that the volume of the storage space 112 of the cartridge 8 decreases, and the pressure inside the storage space 112 rises. Then, the pressure acts in such a way that the liquid Li is pushed in the joint needle 205, and the liquid Li is supplied from the cartridge 8 to the tank 3 through the joint needle 205. Furthermore, part of the liquid Li stored in the storage space 112 of the cartridge 8 moves to the storage space 32 of the tank 3. That is, according to the second embodiment, too, when the cartridge 8 is attached to the cartridge attachment portion 200, the volume of the storage space 112 of the cartridge 8 decreases, and the internal pressure rises, so that occurrence of bubble clogging is prevented.

Furthermore, when the cartridge 8 is detached from the cartridge attachment portion 200, the syringe portion 107 is biased by the elastic body 108, and moves toward the outside of the top panel portion 102, so that the volume of the storage space 112 of the cartridge 8 increases, and the pressure inside the storage space 112 decreases. That is, according to the second embodiment, too, when the cartridge 8 is detached from the cartridge attachment portion 200, the volume of the storage space 112 of the cartridge 8 increases, and the internal pressure decreases, so that dripping of the liquid is reduced.

Third Embodiment

Next, the third embodiment according to the present invention will be described. The third embodiment differs from the first embodiment in that a cartridge erroneous attachment prevention mechanism is provided. The same components as those in the first embodiment will be assigned the same reference numerals and description thereof will be omitted in description of the third embodiment, and only characteristic components of the third embodiment will be described.

Figure 7A:
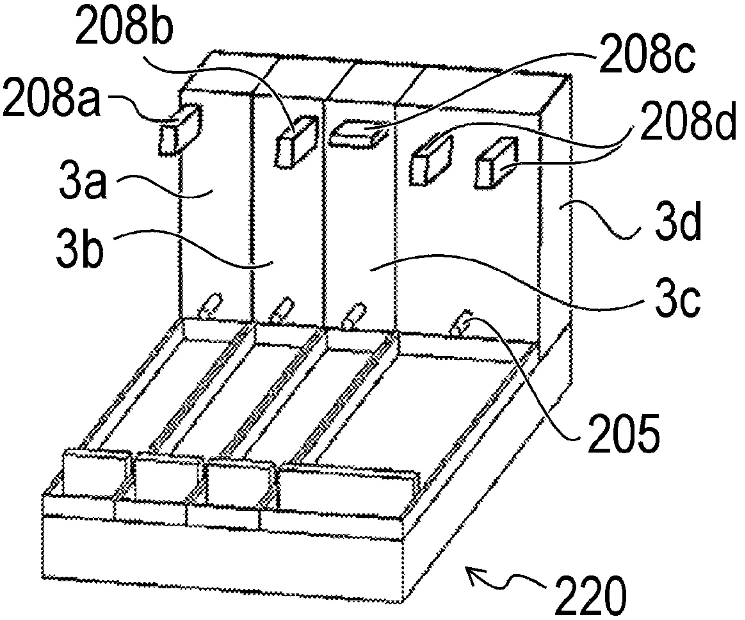
FIGS. 7A and 7B are perspective views of a cartridge attachment portion and a cartridge according to a third embodiment.
Figure 7B:
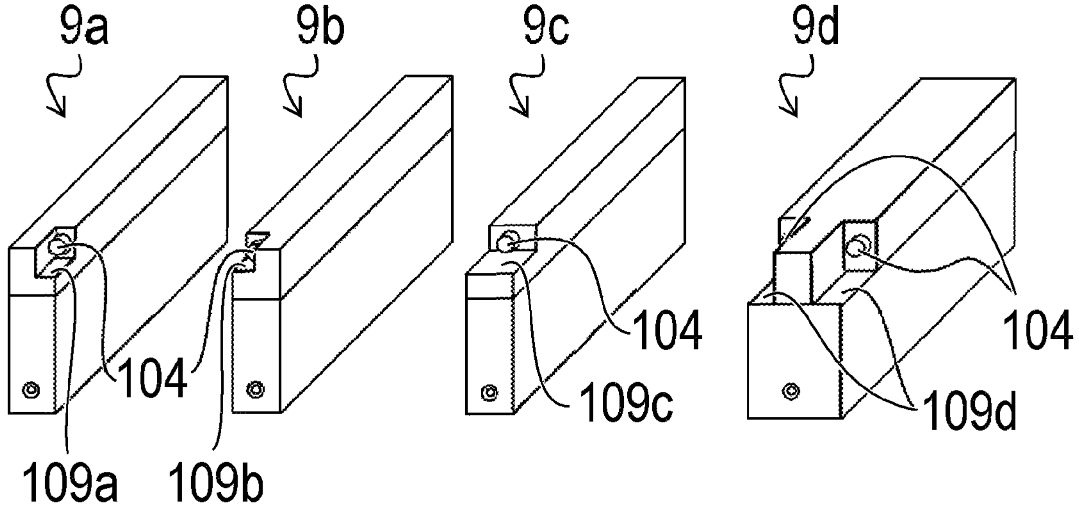

FIG. 7A is a perspective view of a cartridge attachment portion 220 according to the third embodiment. FIG. 7B is a perspective view of a plurality of cartridges 9*a* to 9*d* according to the third embodiment. The cartridge attachment portion 220 is configured such that the four cartridges 9*a* to 9*d* are attachable and detachable, and is provided with four tanks 3*a* to 3*d*.

Each of the cartridges 9*a* to 9*d* stores a liquid of a different color, and is connected to a tank that stores the liquid of the same color among the tanks 3*a* to 3*d*. More specifically, the first cartridge 9*a* is connected with the first tank 3*a*, the second cartridge 9*b* is connected with the second tank 3*b*, the third cartridge 9*c* is connected with the third tank 3*c*, and the fourth cartridge 9*d* is connected with the fourth tank 3*d*.

Each of the four tanks 3*a* to 3*d* is provided with a protrusion as an engagement portion that protrudes from an exterior portion of the tank in the same direction as that of the joint needle 205. The first tank 3*a* is provided with one protrusion portion 208*a*, and the second tank 3*b* is provided with one protrusion 208*b* at a position different from that of the first tank 3*a*. Alternatively, the third tank 3*c* is provided with a protrusion 208*c* of a different shape from that of the protrusion 208*a* provided to the first tank 3*a*, and the fourth tank 3*d* is provided with two protrusions 208*d*. Each of the protrusions 208*a* to 208*d* functions as a contact portion that comes into contact with the damper portion 104, and deforms the damper portion 104.

Each of the four cartridges 9*a* to 9*d* includes as an engagement target portion that engages with the protrusion a cutout formed at one end side in the longitudinal direction of the cartridge provided with the joint portion 103. The cutout is formed in the top panel portion 102, and the damper portion 104 is provided to each of the cartridges 9*a* to 9*d* so as to protrude in the longitudinal direction of the cartridge from the end surface of the cutout.

The first cartridge 9*a* includes a cutout 109*a* formed at a position meeting the protrusion 208*a* of the first tank 3*a*. In other words, the cutout 109*a* is formed such that, when the first cartridge (second storage container) 9*a* is attached to the cartridge attachment portion 220, and is connected to the first tank (first storage container) 3*a*, the first cartridge 9*a* does not interfere with the protrusion 208*a*. Similarly, the second cartridge 9*b* includes a cutout 109*b* formed at a position meeting the protrusion 208*b* of the second tank 3*b*, and the second cartridge 9*b* connectable with the second tank 3*b* without interfering with the protrusion 208*b*. Furthermore, the third cartridge 9*c* includes a cutout 109*c* formed at a position meeting the protrusion 208*c* of the third tank 3*c*, and the third cartridge 9*c* connectable with the third tank 3*c* without interfering with the protrusion 208*c*. Furthermore, the fourth cartridge 9*d* includes two cutouts 109*d* formed at positions meeting the two protrusions 208*d* of the fourth tank 3*d*, and the fourth cartridge 9*d* connectable with the fourth tank 3*d* without interfering with the protrusions 208*d*.

On the other hand, when the first cartridge (second storage container) 9*a* is connected to, for example, the second tank (third storage container) 3*b*, the protrusion 208*b* of the second tank 3*b* interferes with the first cartridge 9*a*, and the first cartridge 9*a* cannot be attached to the cartridge attachment portion 220. Similarly, when the second cartridge (fourth storage container) 9*b* is connected to the first tank (first storage container) 3*a*, the protrusion 208*a* of the first tank 3*a* interferes with the second cartridge 9*b*, and the second cartridge 9*b* cannot be attached to the cartridge attachment portion 220. That is, according to the third embodiment, each of the cartridges 9*a* to 9*d* can be connected to only one of the corresponding tanks 3*a* to 3*d*. By employing such a configuration, the cartridges are prevented from being erroneously attached, and liquids of different colors are prevented from being mixed inside the tanks and the ejection head. As described above, according to the configuration of the third embodiment, it is possible to obtain an effect of preventing occurrence of bubble clogging and an effect of preventing dripping of the liquid, and prevent the cartridges from being erroneously attached.

Note that shapes and arrangement positions of the protrusions, and the number of arranged protrusions are not limited to the above-described embodiments in a case where the present invention is applied. The present invention is also applicable to, for example, a configuration where engagement target portions of respectively different shapes are provided to four cartridges, and engagement portions of respectively different shapes are provided to four tanks to prevent erroneous attachment. Furthermore, the present invention is also applicable to a configuration where cutouts are provided at lower portions of cartridges, and protrusions are provided to a base of a cartridge attachment portion.

Furthermore, in the configuration according to the third embodiment, the fourth cartridge 9*d* is configured to have the larger width than those of the other cartridges to increase a storage amount of a liquid. In a case where a same number of same damper portions are provided to all cartridges of different volumes, the cartridge of a large volume has a lower degree of contribution that a deformation amount of the damper portions increases the pressure inside a storage space compared to the cartridge of a small volume. Hence, according to the third embodiment, the fourth cartridge 9*d* of the large volume is provided with the two damper portions 104.

By providing the more damper portions 104 to the fourth cartridge 9*d*, the volume of the storage space 112 of the fourth cartridge 9*d* greatly changes compared to the other cartridges when the damper portions 104 deform. Eventually, the pressure inside the storage space 112 greatly changes at a time of attachment and detachment of the fourth cartridge 9*d*, so that it is also possible to obtain an effect of preventing occurrence of bubble clogging, and an effect of preventing dripping of a liquid for the fourth cartridge 9*d* comparably to the other cartridges. That is, by changing the configuration and the number of damper portions, and controlling a pressure change amount inside a storage space according to the volume of the storage space of the cartridge or the like, it is possible to appropriately obtain the effect of preventing occurrence of bubble clogging, and the effect of preventing dripping of a liquid.

The three embodiments to which the present invention is applicable have been described above. However, each of these embodiments is not exclusive to each other, and can be also combined. Furthermore, as long as the technical idea of the present invention is met, the other configurations that are not cited here can be also added to each embodiment. For example, the cartridge including the syringe portion described in the second embodiment, and the tank described in the third embodiment may be combined as a form that the syringe portion is pushed in by the protrusion provided to the tank.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-190107, filed on Nov. 29, 2022, which is hereby incorporated by reference herein in its entirety.

What is claimed is:

1. A liquid ejection device comprising:

an ejection head configured to eject a liquid;

a first storage container configured to store the liquid to be supplied to the ejection head; and a second storage container attachable to and detachable from the liquid ejection device and can be connectable with the first storage container, the second storage container including a storage space for containing the liquid to be supplied to the first storage container, wherein the first storage container includes a contact portion that comes into contact with the second storage container in a state where the first storage container is connected with the second storage container, wherein the contact portion deforms the second storage container so as to decrease a volume of the storage space of the second storage container in a process of connecting the second storage container to the first storage container, wherein the second storage container includes an exterior portion forming the storage space, and wherein the contact portion comes into contact with and deforms the exterior portion so as to squash a part of the exterior portion.

2. The liquid ejection device according to claim 1, wherein the exterior portion includes an elastic deforming portion configured to be squashed when the exterior portion comes into contact with the contact portion, and the elastic deforming portion is configured to restore in a case where the second storage container is detached from the liquid ejection device.

3. The liquid ejection device according to claim 1, further comprising a supply path forming portion that forms a supply path of the liquid, the supply path continues from the first storage container to the second storage container, wherein the contact portion is configured to come into contact with the second storage container after the supply path forming portion is connected to the second storage container in a case where the second storage container is attached to the liquid ejection device.

4. The liquid ejection device according to claim 1, further comprising:

a third storage container configured to store the liquid to be supplied to the ejection head; and a fourth storage container configured to be connectable to and disconnectable from the third storage container, the fourth storage container configured to store the liquid to be supplied to the third storage container, wherein the second storage container includes an engagement target portion that engages with an engagement portion of the first storage container in a case where the second storage container is connected to the first storage container, and wherein the engagement portion of the first storage container is configured to interfere with the fourth storage container in a case where the fourth storage container is to be connected to the first storage container.

5. The liquid ejection device according to claim 1, wherein the contact portion is an exterior portion of the first storage container.

6. The liquid ejection device according to claim 1, further comprising a fixing portion that fixes the second storage container to the liquid ejection device in a case where the second storage container is attached to the liquid ejection device.

7. The liquid ejection device according to claim 1, wherein the first storage container is a tank configured to store the liquid, and wherein the second storage container is a cartridge configured to be attachable to and detachable from the liquid ejection device.

8. A liquid ejection device comprising:

an ejection head configured to eject a liquid;

a first storage container configured to store the liquid to be supplied to the ejection head; and a second storage container attachable to and detachable from the liquid ejection device and can be connectable with the first storage container, the second storage container including a storage space for containing the liquid to be supplied to the first storage container, wherein the first storage container includes a contact portion that comes into contact with the second storage container in a state where the first storage container is connected with the second storage container, wherein the contact portion deforms the second storage container so as to decrease a volume of the storage space of the second storage container in a process of connecting the second storage container to the first storage container, wherein the second storage container includes an exterior portion forming the storage space and an opening of the storage space, and a syringe portion that is configured to be movable with respect to the exterior portion in a state of closing the opening, wherein a part of the syringe portion is located outside the storage space, and wherein the contact portion comes into contact with the syringe portion to move the syringe portion such that the syringe portion enters inside the storage space.

9. The liquid ejection device according to claim 8, wherein the second storage container further includes a biasing member that biases the syringe portion in a direction of pushing the syringe portion to an outside of the exterior portion.

10. The liquid ejection device according to claim 8, further comprising a supply path forming portion that forms a supply path of the liquid, the supply path continues from the first storage container to the second storage container, wherein the contact portion is configured to come into contact with the syringe portion after the supply path forming portion is connected to the second storage container in a case where the second storage container is attached to the liquid ejection device.

* * * * *